Aug. 29, 1961  R. E. BECKER  2,998,021
PNEUMATIC CONTROL UNIT
Filed Oct. 18, 1956  3 Sheets-Sheet 1
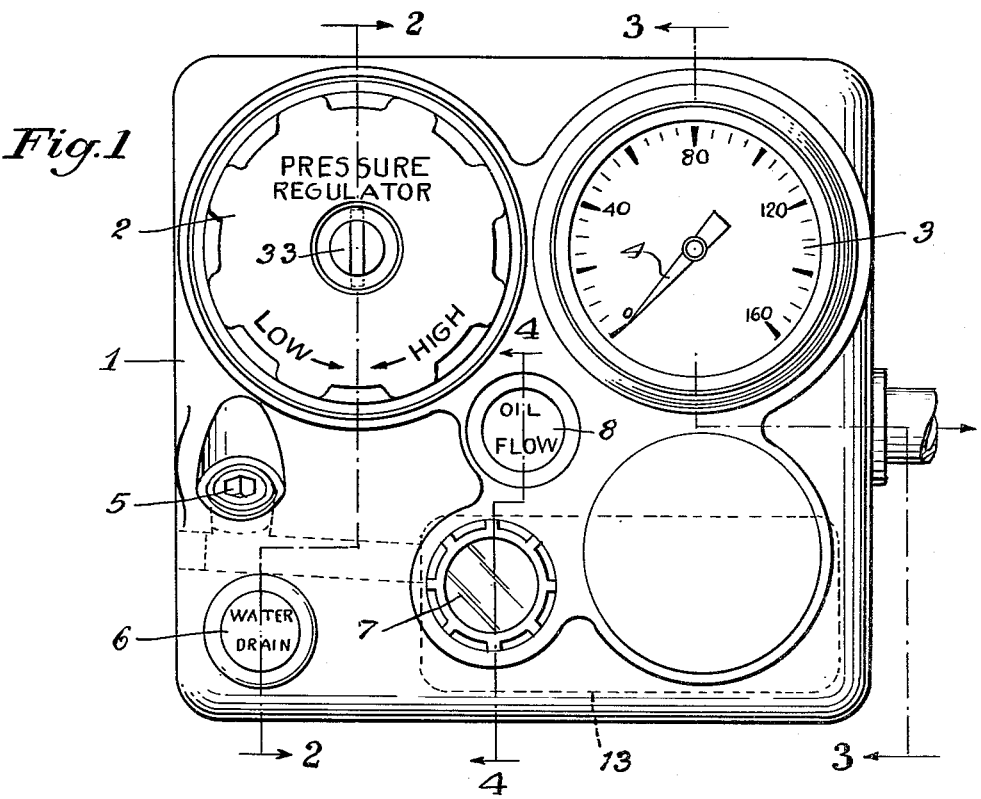
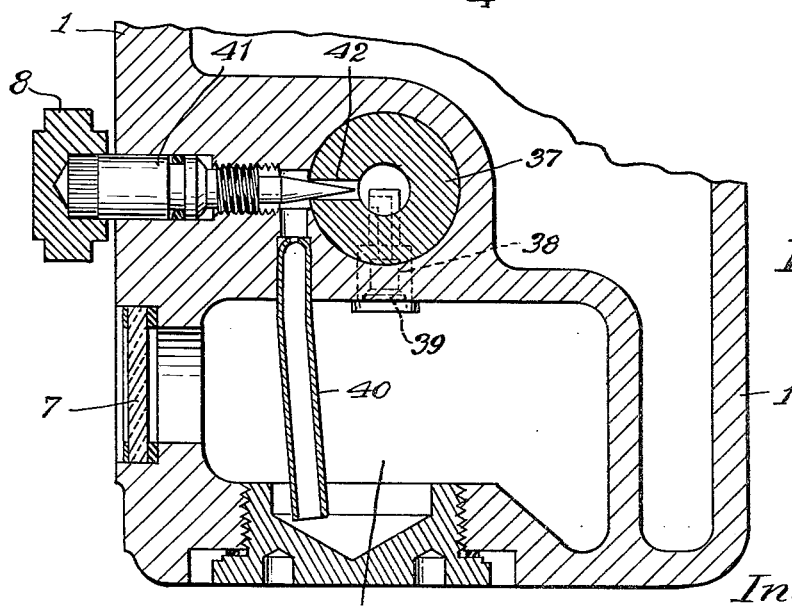
Inventor
Robert E. Becker
by Parker & Carter
Attorneys Aug. 29, 1961 R. E. BECKER 2,998,021
PNEUMATIC CONTROL UNIT
Filed Oct. 18, 1956 3 Sheets-Sheet 3

Inventor
Robert E. Becker by Parker & Carter
Attorneys

United States Patent Office 2,998,021
Patented Aug. 29, 1961

2,998,021
PNEUMATIC CONTROL UNIT
Robert E. Becker, Logansport, Ind., assignor to Logansport Machine Co., Inc., a corporation of Indiana
Filed Oct. 18, 1956, Ser. No. 616,863
1 Claim. (Cl. 137—116.5)

My invention relates to a pneumatic control unit and has for one object to provide a single unit which may be interposed between a source of air under pressure and the work whereby clean, lubricated air may be supplied at any desired pressure.

Another object of the invention is to provide a mechanism whereby the pressure gauge may track with the change in pressure without the necessity of bleeding off pressure as a prerequisite to accurate pressure gauge reading.

Another object of the invention is to filter the air from the source before it is controlled in pressure and lubricated.

Another object of the invention is to provide a pressure control means which will be instantly responsive to variation in demand.

Other objects will appear from time to time throughout the specification and claim.

My invention is illustrated more or less diagrammatically in the accompanying drawings, wherein—

FIGURE 1 is a front elevation of the unit;

FIGURE 4 is a detail section along the line 4—4 of FIGURE 1.

Like parts are indicated by like characters throughout the specification and drawings.

Figure 2:
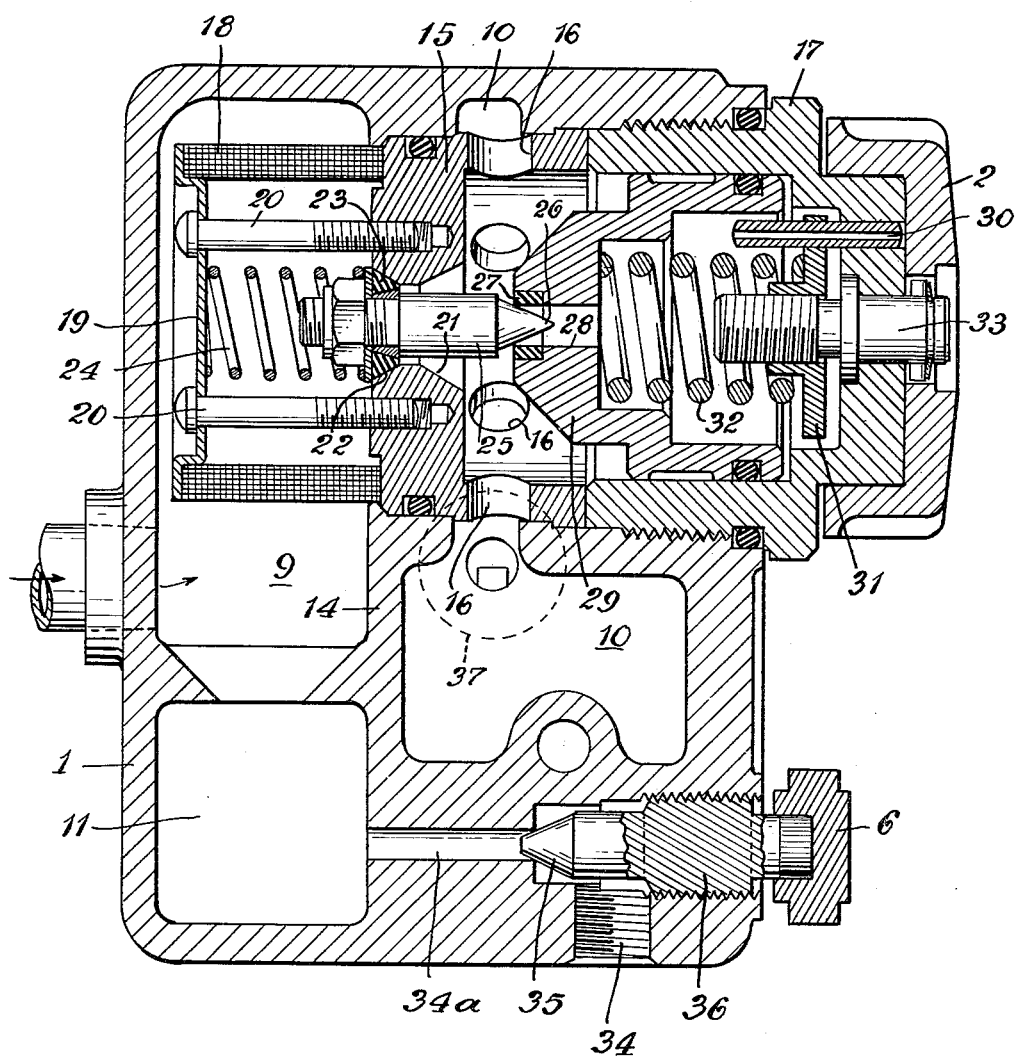
FIGURE 2 is a section along the line 2—2 of FIGURE 1 looking in the direction of the arrows.
Figure 3:
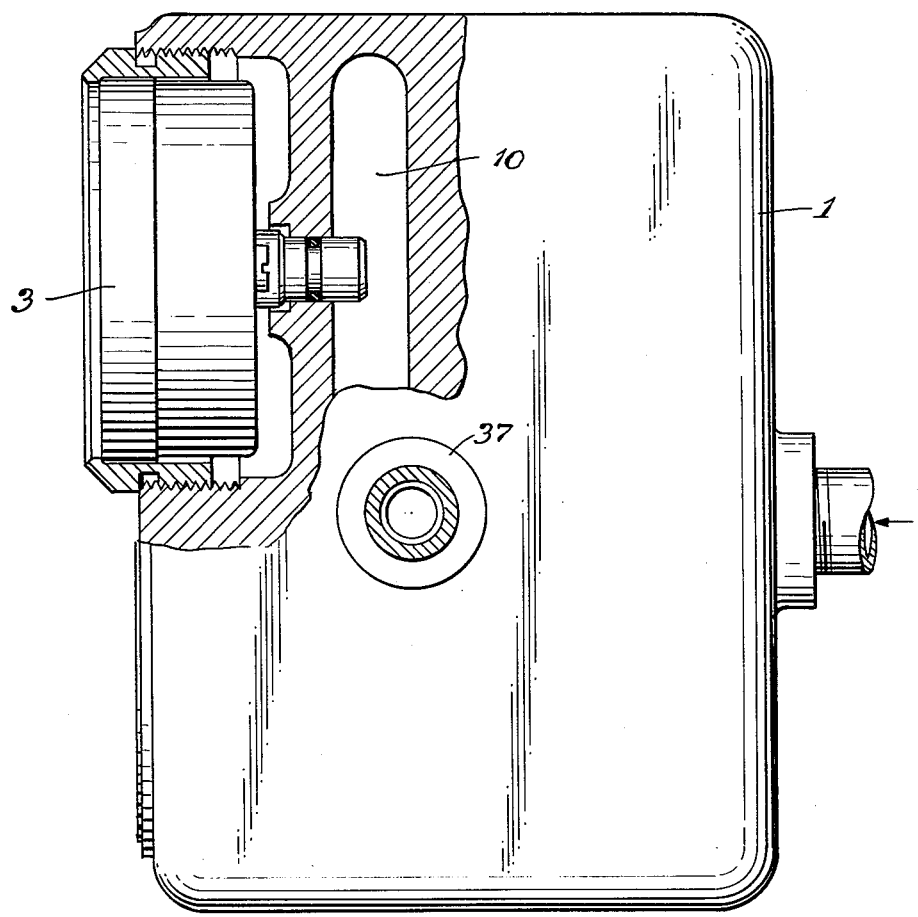
FIGURE 3 is a side elevation of the right hand side of FIGURE 1 in part section along the line 3—3 of FIGURE 1.

A housing 1 on its face shows a pressure regulator knob 2, a pressure gauge 3 having the usual dial with needle 4, an oil filler plug 5, a drain valve button 6, an oil level gauge lens 7 and an oil control button 8. The means for mounting the unit and the connections from source of air supply and connections to the work form no part of the present invention and sometimes varying in accordance with the tool with which the unit is to be used are in the interest of clarity, not illustrated.

The drain chamber 11 is below and communicating with the chamber 9 and adapted to receive foreign particles or fluids which come into the system from the source of supply. 13 is the oil chamber, the level of the oil in the chamber being visible through the lens 7. The pressure gauge 3, the details of which being conventional are not illustrated, is responsive to pressure in the chamber 10. The chambers 9 and 10 are separated by a partition wall 14 in which is socketed the lower regulator body 15 which takes the form of a flat disk with a cylindrical flange apertured as indicated at 16 so that there is free communication between the space within the flange and the chamber body 10. 17 is the upper regulator body threaded in the wall of the housing and abutting on and holding the flanged regulator body seated. The lower regulator body 15 carries within the chamber 9 the annular filter element 18 held in place by the filter retainer plate 19, and screws 20.

The lower regulator body is centrally apertured to provide a passage 21, being encircled by a valve seat 22 on which seats the poppet valve 23 biased to be seated by the spring 24, the filter retainer plate 19 serving as a spring abutment. The poppet valve 23 is carried by a valve stem 25 terminating in a needle point 26 in opposition to the bleed off valve seat 27 encircling the passage 28 through the closed end of the regulator piston 29, the piston 29 being slidably mounted in the upper regulator body 17.

30 is a hollow guide pin socketed in the closed end of the regulator knob 2. A spring seat 31 is in slidable relation with and held against rotation by the hollow pin 30. A regulator spring 32 is compressed between the spring seat 31 and the closed end of the regulator piston 29. The threaded adjustment shaft 33 is rotatably mounted in the closed end of the upper regulator body 17, interlocks with the regulator knob 2 and when rotated by the knob moves the spring seat or spring abutment plate 31 back and forth to vary the pressure in the spring 32.

The bleeder duct 34a leads from chamber 11 for discharge through 34, the duct being closed by the pointed needle end 35 of the flanged bleeder valve 36 controlled by the button 6.

The venturi tube 37 is socketed in the housing so that low pressure air from chamber 10 may be discharged for use. 38 is an air duct controlled by a check valve 39 on the upstream side of the venturi so that air applies pressure to the chamber 13. Such pressure forces oil upwardly from the chamber through duct 40 and thence under control of the needle valve 41 actuated by the button 8 through passage 42 to the venturi so that such oil may be picked up by the air rushing through the throat of the venturi tube.

The use and operation of the invention are as follows:

With the pressure regulator knob rotated in counter clockwise direction to the end of its excursion, the spring abutment plate will be withdrawn to the right in FIGURE 1. The pressure applied by the regulator spring through the upper regulator body, the valve and valve stem to the regulator valve will be such that if there is pressure in the high pressure chamber, the regulator valve will be seated. Any foreign matter which may come into the high pressure chamber with the air from the source of supply will be filtered out by the annular filter, drop into the drain chamber and may thence be discharged to sump, being blown out by air pressure when the drain valve is open.

When it is desired to have pressure in the low pressure chamber, the regulator knob will be turned in a clockwise direction, moving the spring seat to the left, increasing the pressure exerted by the regulator spring to cause the regulator valve to unseat to permit flow of air into the low pressure chamber. Air pressure on the regulator valve tends to seat it, and spring pressure on the regulator piston tends to unseat it. As pressure builds up in the low pressure chamber, that low pressure, distributed over the cross sectional area of the piston, tends with the pressure on the regulating valve itself to seat the valve and so depending on the position of the regulator knob, a position of equilibrium will be reached at which the difference between the pressure on the high pressure side and the pressure on the low pressure side is selected by the operator in his manipulation of the regulator knob. Under these circumstances, as pressure is bled off for use from the low pressure side, the air pressure applied to the piston will decrease and the regulator valve will open sufficiently to permit pressure to equalize. On the other hand, if for any reason pressure in the low pressure side builds up beyond the desired setting, even though the regulator valve is seated, such excess pressure will overcome the bias of the regulator spring and permit air to pass through the piston to escape through the hollow tube into the clearance below the regulator knob and thence to atmosphere. As soon as the pressure has equalized, the piston will return to seat and the equilibrium situation will be resumed.

This situation prevails constantly and the low pressure chamber always retains, as the valve moves back and forth, the desired pressure which will be reflected on the air gauge without the necessity of bleeding off as is usual in the art.

The air before it is regulated has been cleaned of foreign matter by the filter but in many instances, it is desirable to have the air carry with it lubricating oil so as the air passes through the venturi shown in FIGURE 4, it also exerts a pressure on the level of the oil in the oil well and force that oil upward past the needle valve to discharge into the flow of the venturi. The operator operates the oil control needle valve to regulate the desired amount of oil supplied to the air stream between zero and a maximum.

I claim:

A compact, unitary pressure regulator including a casing, high and low pressure chambers within the casing, a wall between the chambers, said wall having a regulator valve port therein opening into each chamber to thereby provide a fluid flow path between the chambers, a high pressure inlet opening into the high pressure chamber, a low pressure outlet opening into the low pressure chamber, a cylinder projecting through the casing, a piston in the cylinder having a relief port therein, said cylinder, piston and relief port being in axial alignment with the regulator port, a regulator valve adapted to seat in the regulator port, said regulator valve having a stem extending towards the piston relief port, a relief valve on the opposite end of the stem adapted to close the relief port when seated therein, the regulator valve being independently biased toward valve closing position by the pressure in the high pressure chamber, a pressure regulating spring associated with the piston, means for adjusting it to urge the piston and the valve toward valve opening position, a control stem rotatably mounted in the outwardly projecting end of the cylinder and held against longitudinal displacement, a spring abutment in threaded relation to the stem, the pressure regulating spring being between the abutment and the piston, vent means for venting the cylinder behind the piston to atmosphere, said vent means extending through the abutment and cylinder to thereby prevent rotational movement of the abutment, exterior means on the casing for rotating the stem, a sedimentation chamber positioned below the high pressure chamber, a passage therebetween, a blow down passage extending from the sedimentation chamber and discharging from the regulator at a point below the bottom of the high pressure chamber, a blow down valve adapted to open and close the blow down passage, and means outside the casing for rotating the blow down valve.

References Cited in the file of this patent

UNITED STATES PATENTS

| | | |
|---|---|---|
| 1,465,654 | Radtke | Aug. 21, 1923 |
| 2,150,460 | Riches | Mar. 14, 1939 |
| 2,313,564 | Manly | Mar. 9, 1943 |
| 2,342,659 | Grove | Feb. 29, 1944 |
| 2,439,242 | Curtis | Apr. 6, 1948 |
| 2,524,264 | Knox | Oct. 3, 1950 |
| 2,581,429 | Meyer | Jan. 8, 1952 |
| 2,707,051 | Mailhot et al. | Apr. 26, 1955 |
| 2,730,269 | Earle et al. | Jan. 10, 1956 |
| 2,731,975 | Boals | Jan. 24, 1956 |
| 2,747,688 | Faust | May 29, 1956 |
| 2,762,457 | Andresen | Sept. 11, 1956 |
| 2,789,574 | Tucker | Apr. 23, 1957 |
| 2,806,481 | Faust | Sept. 17, 1957 |